United States Patent
Yung

(10) Patent No.: US 6,196,113 B1
(45) Date of Patent: Mar. 6, 2001

(54) FOOD APPLIANCE AND A CODING SYSTEM THEREFOR

(76) Inventor: Simon K. C. Yung, 6 Purves Road, Jardine's Lookout (HK)

(*) Notice: Subject to any disclaimer, the term of this patent is extended or adjusted under 35 U.S.C. 154(b) by 0 days.

(21) Appl. No.: 09/385,162

(22) Filed: Aug. 30, 1999

Related U.S. Application Data

(60) Division of application No. 09/061,296, filed on Apr. 16, 1998, now Pat. No. 5,967,021, which is a continuation-in-part of application No. 08/915,654, filed on Aug. 21, 1997, now Pat. No. 5,794,521, which is a continuation of application No. 08/346,432, filed on Nov. 29, 1994, now Pat. No. 5,704,277.

(51) Int. Cl.[7] .............................. A21B 1/00; A21D 8/00; A47J 27/00; A47J 37/01
(52) U.S. Cl. ............................... 99/327; 99/348; 99/468; 366/144; 366/146; 366/314
(58) Field of Search .............................. 99/325–335, 348, 99/467, 468, 483, 484, 486; 366/69, 96–98, 144–146, 149, 341, 314, 601; 426/504, 512

(56) References Cited

U.S. PATENT DOCUMENTS

| | | | |
|---|---|---|---|
| 4,234,605 | * 11/1980 | Takeuchi | 426/18 |
| 4,550,653 | * 11/1985 | Hedenberg | 99/348 |
| 4,781,933 | * 11/1988 | Fraioli | 426/242 |
| 4,803,086 | * 2/1989 | Hedenberg | 426/87 |
| 4,841,125 | 6/1989 | Edamura . | |
| 4,984,512 | * 1/1991 | Takahashi et al. | 99/327 |
| 5,076,153 | * 12/1991 | Takahashi et al. | 99/327 |
| 5,267,211 | 11/1993 | Kobayashi et al. . | |
| 5,280,150 | * 1/1994 | Arai et al. | 99/348 X |
| 5,317,134 | 5/1994 | Edamura . | |
| 5,392,695 | * 2/1995 | Junkel | 99/328 |
| 5,415,081 | * 5/1995 | Yoshida et al. | 99/326 |
| 5,421,713 | * 6/1995 | Backus et al. | 99/348 X |
| 5,433,139 | * 7/1995 | Kitagawa et al. | 99/327 |
| 5,445,061 | * 8/1995 | Barradas | 99/340 |
| 5,463,936 | 11/1995 | Clark et al. . | |
| 5,600,711 | 2/1997 | Yuen . | |
| 5,619,614 | * 4/1997 | Payne et al. | 99/327 |
| 5,829,341 | 11/1998 | Lin . | |

FOREIGN PATENT DOCUMENTS

| | | |
|---|---|---|
| 29809496 | 9/1998 | (DE) . |
| 0818942 | 1/1998 | (EP) . |
| WO96/16550 | 6/1996 | (WO) . |

* cited by examiner

*Primary Examiner*—Timothy Simone
(74) *Attorney, Agent, or Firm*—Majestic, Parsons, Stebert & Hsue P.C.

(57) ABSTRACT

A versatile food appliance includes a set of hardware components common to a plurality of single-purpose food appliances. The set of hardware components is controlled by a microcontroller executing a program from a repertoire thereof stored in the general-purpose food appliance. Many processing programs are stored for operating the appliance in different modes and for processing different kinds of food by using different ingredients. Each processing program is assigned a code and can be selected by specifying the code associated with it from a control panel. The programs may be further modified parametrically by a group of process parameters. Ingredients to be used in each of the programs may be in a premixed form in a package with the code optionally labeled thereon. The repertoire of programs is updatable by the user. In the preferred embodiment, a memory card interface allows updated programs to be introduced via a removable flash memory card.

31 Claims, 7 Drawing Sheets

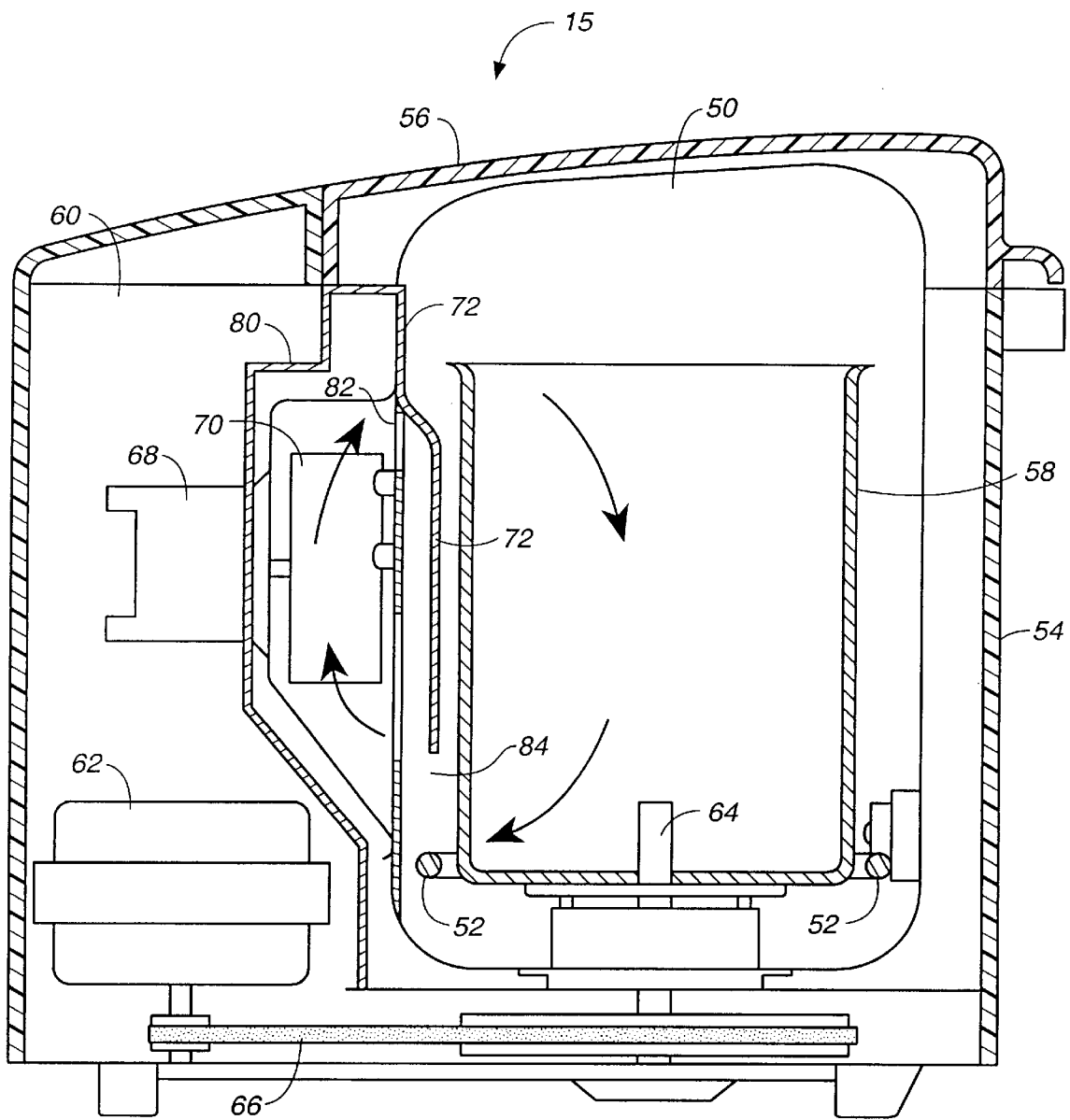
FIG._1

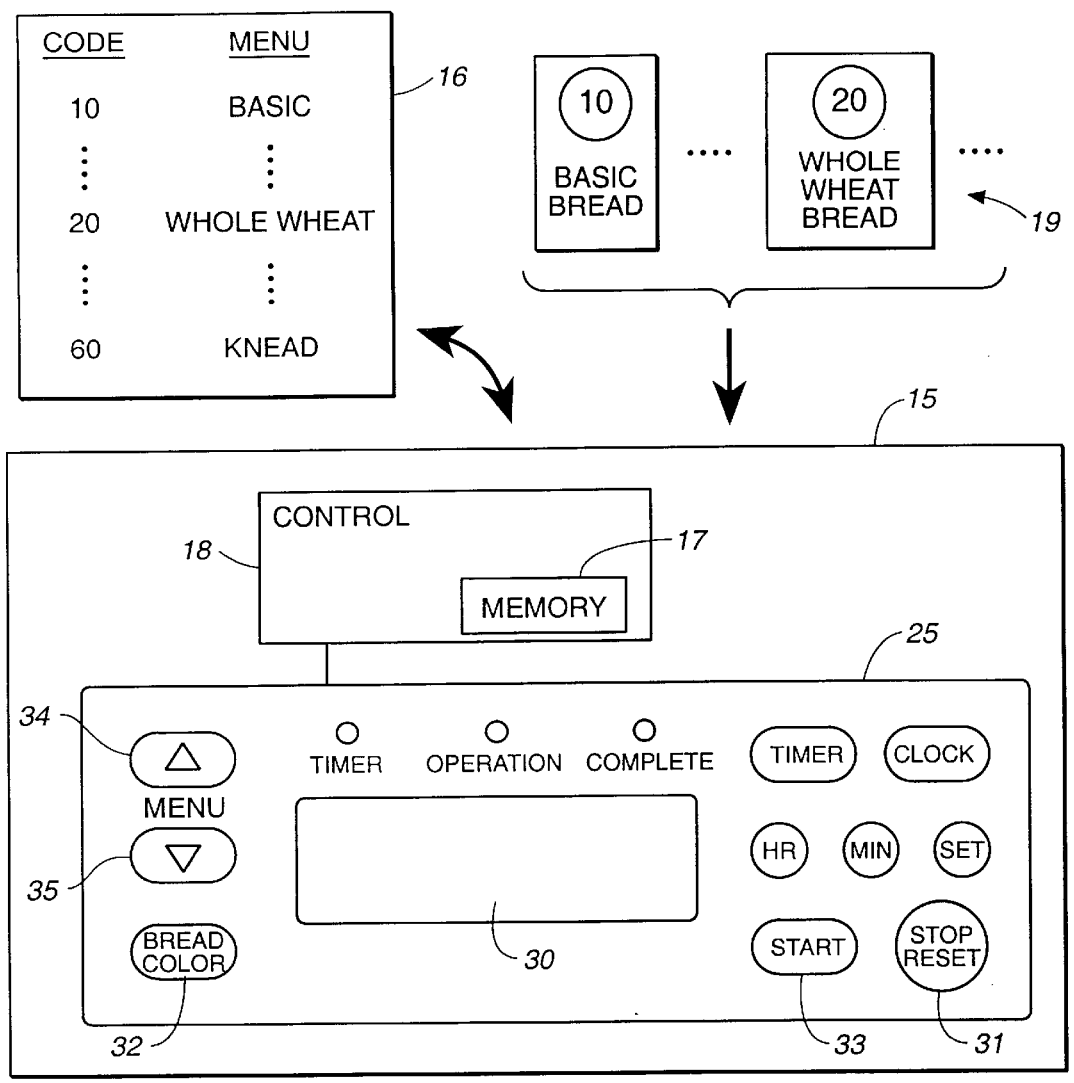
FIG._2
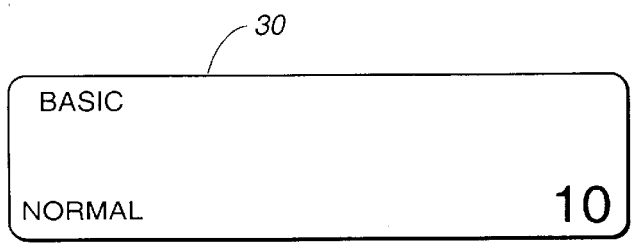
FIG._4

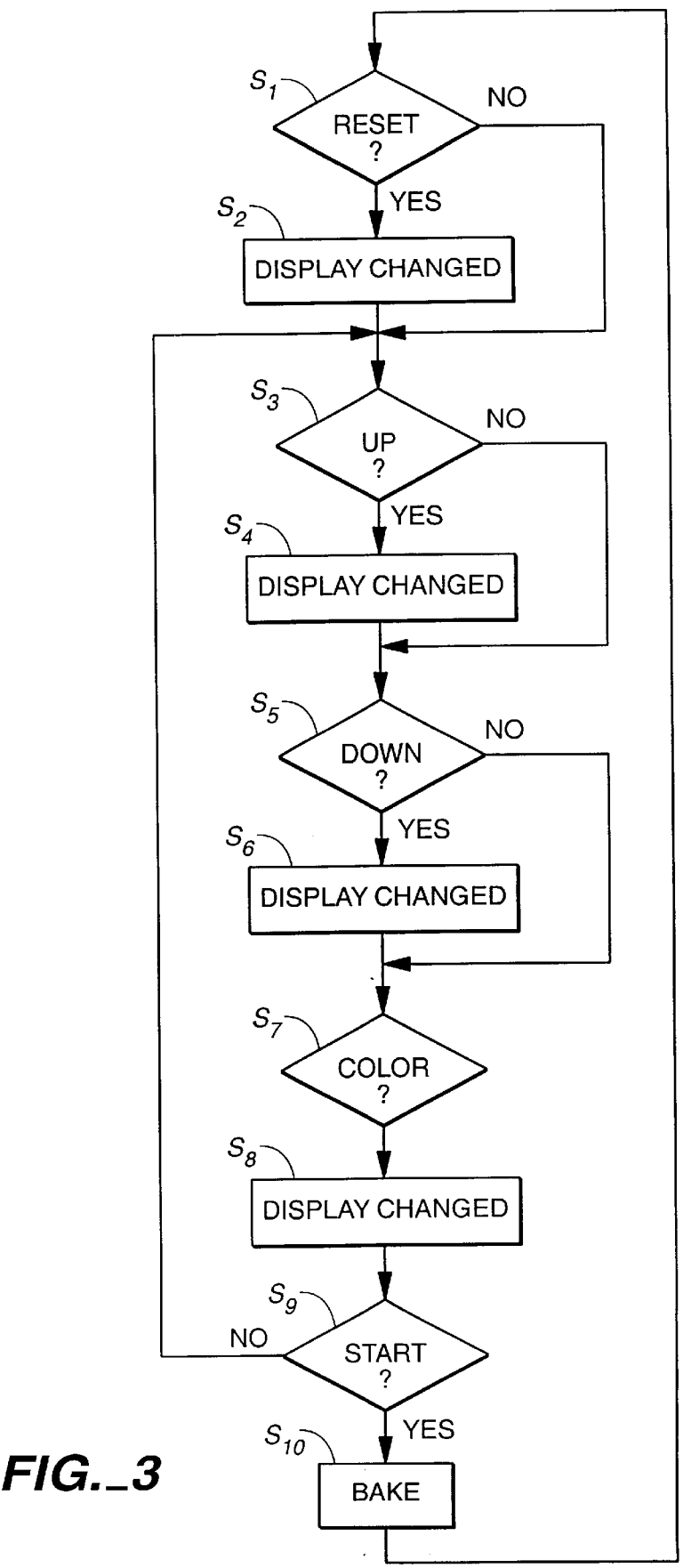
FIG._3

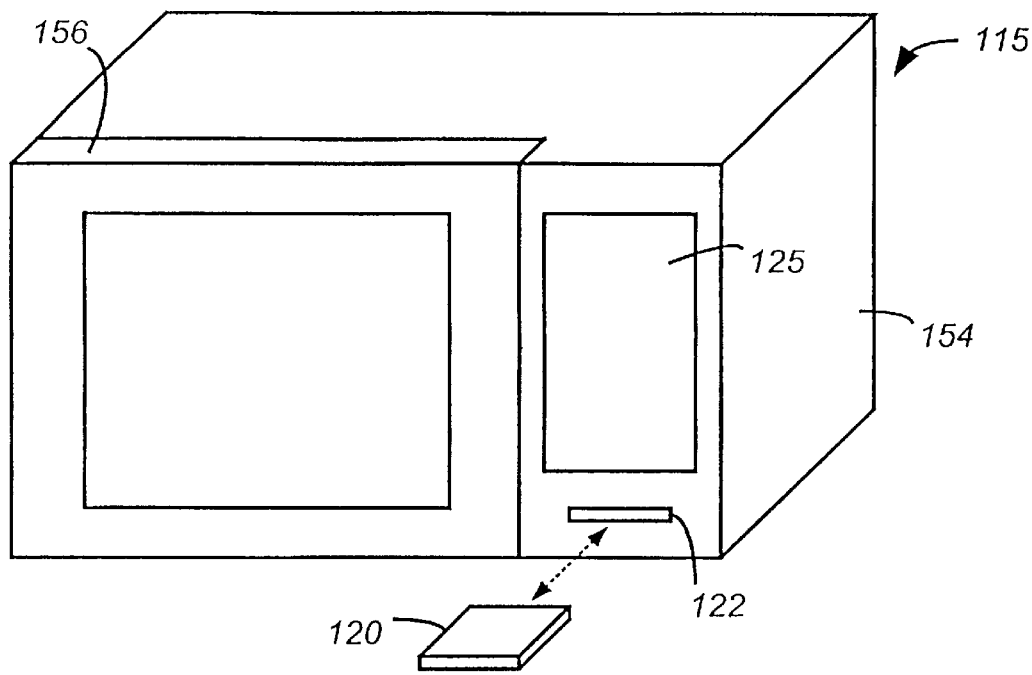
FIG._5A
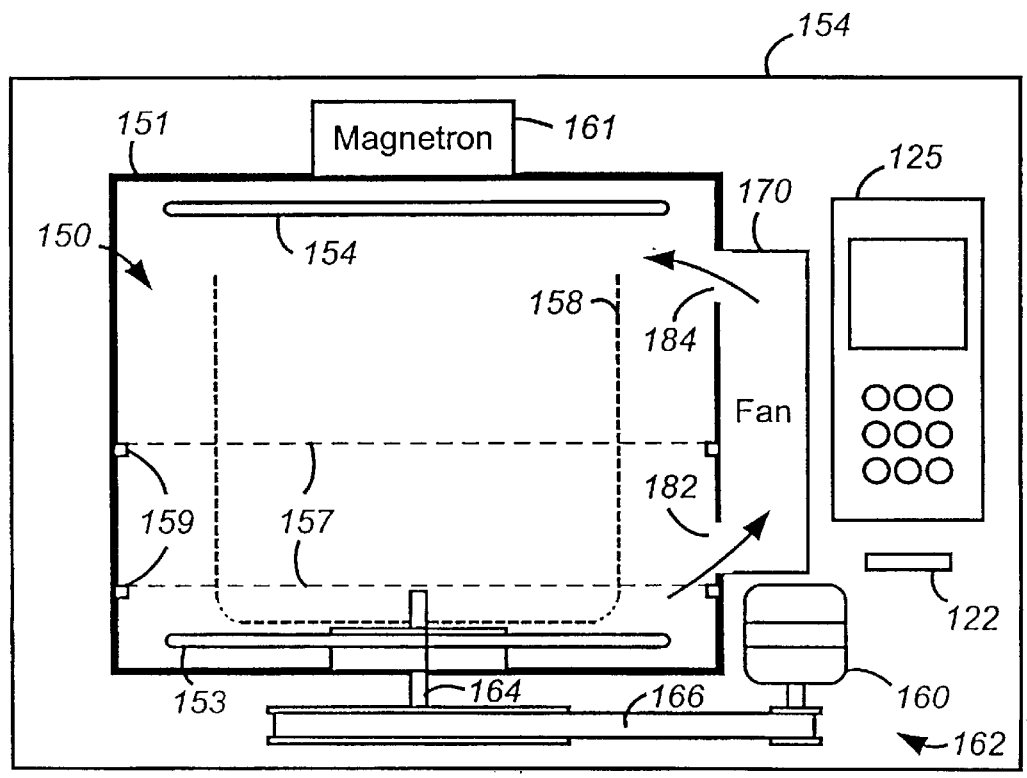
FIG._5B

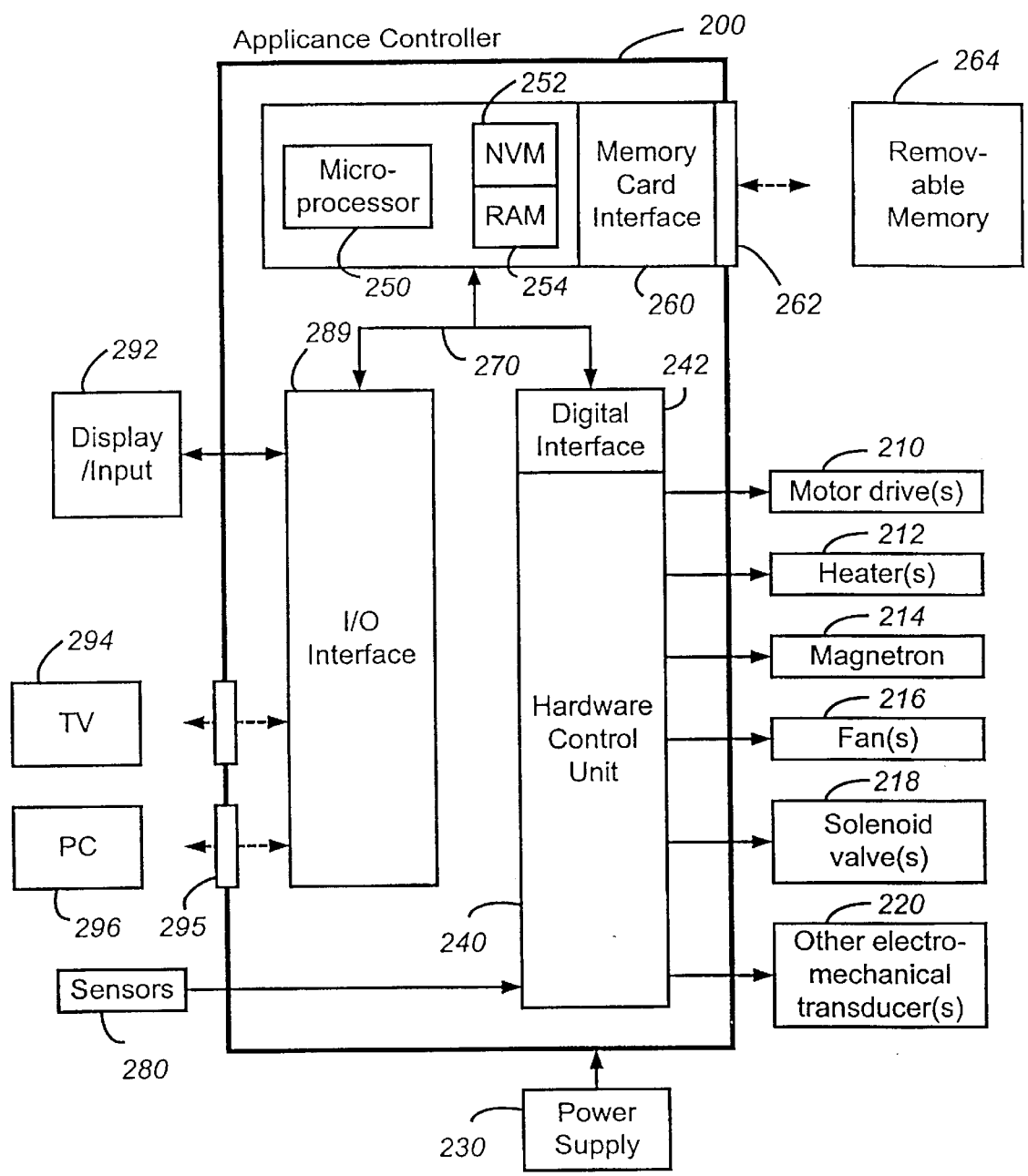
FIG._6

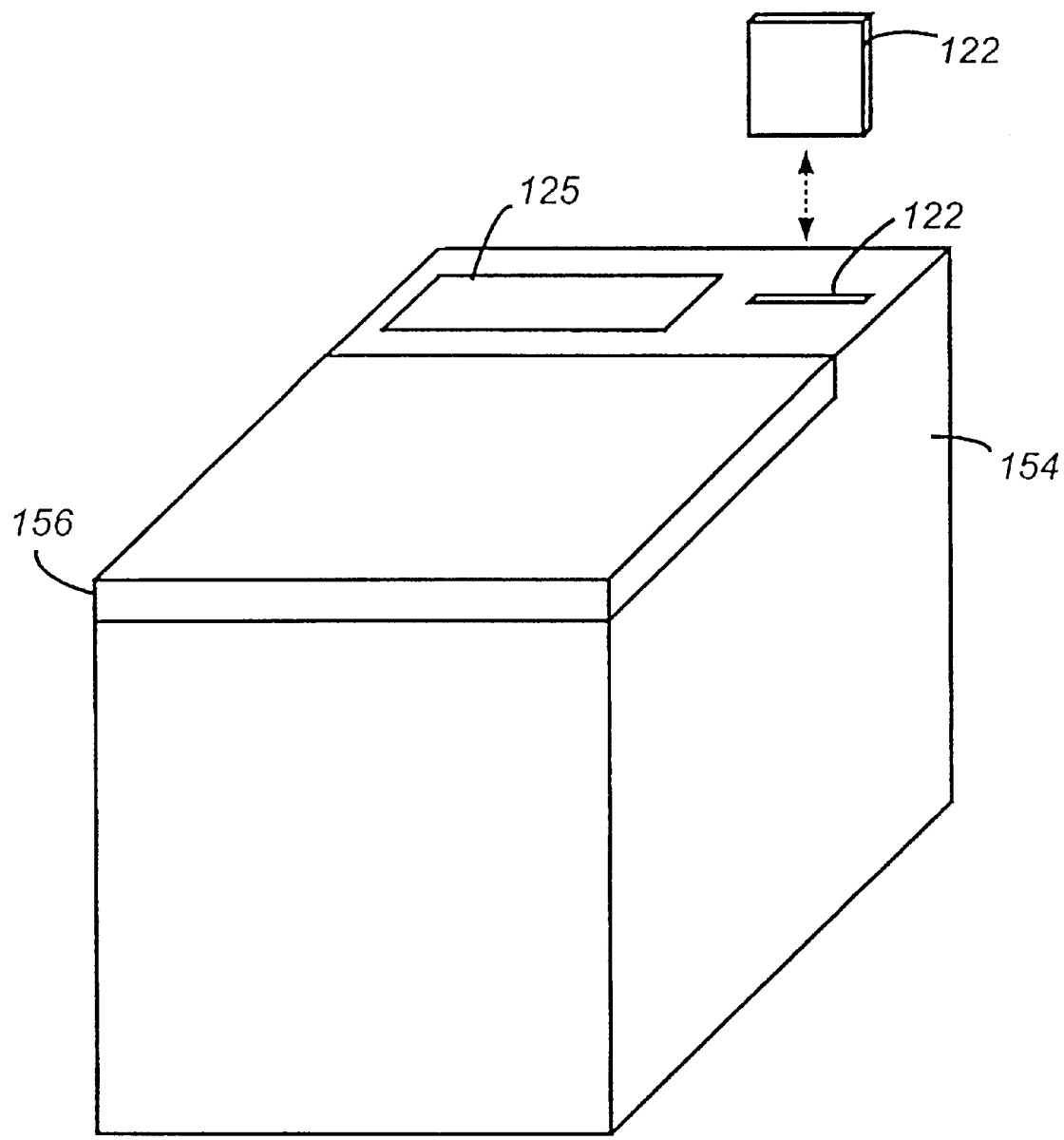
FIG._7

← 316

| Parameter Code | Process Parameter Configuration | Description | ... |
|---|---|---|---|
| 520 ⋮ | (5, 120, 20, ...) ⋮ | Light ⋮ | ... ⋮ |
| 530 ⋮ | (5, 130, 20, ...) ⋮ | Medium ⋮ | ... ⋮ |
| 540 ⋮ | (5, 140, 20, ...) ⋮ | Brown ⋮ | ... ⋮ |

FIG._8

```
    CODE        MENU                  16'

10520       BASIC - Light
    10530       BASIC - Medium
    10540       BASIC - Brown
       .           .
       .           .
       .           .
    20520       WHOLE WHEAT - Light
       .           .
       .           .
       .           .
    60430       KNEAD
       .           .
```

FIG._9

FOOD APPLIANCE AND A CODING SYSTEM THEREFOR

This is a division of U.S. patent application Ser. No. 09/061,296, filed Apr. 16, 1998, now U.S. Pat. No. 5,967,021, which is a continuation-in-part of U.S. patent application Ser. No. 08/915,654, filed Aug. 21, 1997, now U.S. Pat. No. 5,794,521 which is a continuation of U.S. patent application Ser. No. 08/346,432, filed Nov. 29, 1994, now U.S. Pat. No. 5,704,277.

FIELD OF INVENTION

This invention relates to an improved food appliance and, more particular, to a versatile food appliance having a coding system for program-control and including features for program updates that can be effected by an end-user.

BACKGROUND OF THE INVENTION

One embodiment of a food appliance in the form of a breadmaker with coding system has been disclosed in U.S. Pat. No. 5,704,277. The program-controlled machine operates according to one of a plurality of provided specified programs by receiving materials required in the specified program such as ingredients of a selected kind of bread to be baked.

Breadmakers of the type comprising a baking chamber containing an electric heater at the bottom, a baking pan which is a container to be set inside the baking chamber for receiving ingredients therein, a stirrer for stirring and kneading the ingredients inside the baking pan and a motor for rotating the stirrer in a specified manner, have been known.

Breadmakers of the type storing a plurality of programs and allowing a user to select one of them for baking a desired kind of bread have also been known. These programs generally include many complicated steps such as mixing selected ingredients and controlling the baking temperature. With some prior art breadmakers, the user is required to read a cookbook carefully to ascertain the necessary steps before setting an appropriate program.

Some breadmakers are preprogrammed, and the user has only to specify the desired kind of bread to be baked, the breadmaker automatically carrying out the program associated with the specified kind of bread.

For allowing the user to specify the kind of bread to be baked, some breadmakers are designed to display, as power is switched on, the types of bread that can be specified. An indicator is initially displayed at a default position, say, next to the name of the most commonly selected kind of bread, and the user operates a SELECT button until the indicator moves one position at a time to finally reach a position next to the desired kind of bread.

Alternatively, the breadmaker may be provided with as many push buttons as the number of different kinds of bread that can be baked thereby, and the user is required to push the button corresponding to the desired kind of bread. With prior art breadmakers, therefore, the number of programs from which the user can select one is limited because the screen of the display device is not large and the control panel of the machine cannot accommodate too many buttons.

With prior art breadmakers, furthermore, the user must carefully add the required ingredients such as flour, sugar, salt and yeast. In other words, prior art breadmakers are not energy-efficient and are difficult to use and the choice of different kinds of bread that can be baked thereby cannot be increased significantly.

Prior art breadmakers and other program-controlled appliances have a limited set of preset programs they can operate on. That is, the repertoire of programs that can be executed by a breadmaker or a similar appliance is fixed at the factory. If a new recipe calls for a different process, the user can at best approximate it by selecting the closest existing preset program. In most cases, the user will have to purchase newer models of the machine in order to have the newer features and processes.

Furthermore, prior art food processing machines tend to be task-specific and single-purpose. For example, a breadmaker is dedicated to making bread, a rice cooker for cooking rice, a rotisserie for roasting, a regular oven or a microwave oven or a convection oven for either general-purpose or specific kind of baking, toasting and broiling, etc.

SUMMARY OF THE INVENTION

It is a general object of the invention to provide a versatile food appliance with updatable program control for replacing a plurality of dedicated appliances.

It is another object of the invention to provide a food appliance with a coding system in which a new recipe or a premixed package of ingredients can be associated with a predefined program.

It is another object of the invention to provide a food appliance having a repertoire of programs capable of being updated in the field by a user.

It is another object of the invention to provide a new coding system for a program-controlled machine such as a breadmaker or other food appliance which allows a user to select one from a larger number of different kind of products and to cause the machine to operate automatically on a program appropriate for the selected product.

It is still another object of the invention to provide such a coding system with which the user is less likely to make an error in providing ingredients for the specified product.

It is still another object of the invention to provide a versatile food appliance capable of operating as a breadmaker or other dedicated machine and which is equipped with such an improved coding system.

It is still another object of the invention to provide a food appliance which can efficiently store a large number of programs.

An improved breadmaker embodying the present invention, with which the above and other objects can be achieved, may be characterized as being like a prior art breadmaker comprising a baking chamber having a heater therein, a baking pan adapted to receive ingredients therein and be set inside the baking chamber, a stirrer for stirring and kneading the ingredient inside the baking pan and a motor for rotating the stirrer in a specified manner, and also comprising an air-circulating means such as a centrifugal fan for causing the air inside the baking chamber to move upward through the fan and to circulate downward around the baking pan.

A coding system embodying the invention, with which the above and other objects can be accomplished, may be characterized as being associated with a machine adapted to carry out selectively any of a plurality of tasks according to a program and by using specific materials both associated with the selected task. An example of such machines is a breadmaker programmed to make different kinds of bread by using different mixtures of ingredients. Each of the products that can be obtained by such a machine is assigned a different code, and a table, serving as an indexing means, is provided to show what code has been assigned to each of the products that can be made or processed by the machine, and a user specifies the product to be obtained or processed by inputting the corresponding code. The materials to be used by the machine for making a product of the specified kind or carrying out a specified process may be provided in the form of a premixed package with the corresponding code clearly printed thereon such that the user is spared of the trouble of mixing the required ingredients himself/herself. The user may specify the code corresponding to the desired product by directly forming it on numeric or alphanumeric keys, or by causing available codes to appear sequentially on a display device one by one and pressing a process-starting button when the code corresponding to the desired product or process is displayed.

One feature of the invention allows a food appliance to run additional new programs outside its existing repertoire. This is accomplished by providing facility for a user to transfer new programs to the food appliance.

In one embodiment, the new programs or updates are transferred via a standard data port, such as a parallel port, or a serial port, or an infrared port provided with the food appliance.

In another embodiment, the new programs or updates are transferred via a memory port which is able to receive a removable memory card.

Another feature of the invention incorporates multiple functions into a versatile appliance operating under the control of programs which are updatable. In this way, one versatile machine or appliance can replace several dedicated machines. This is accomplished by incorporating in the versatile appliance the hardware components common to a plurality of dedicated food machines.

An economy of scale is achieved since the different dedicated food machines have many components in common. When only the common denominators of these components are included in the versatile food appliance, duplication is avoided.

Another advantage is that with the multiple function capability of the food appliance, there exists synergy and sophistication of processing that are not possible in conventional dedicated appliances. Since the versatile food appliance is capable of a rich set of functionalities, it is particularly useful to provide the facility for programs updates even after the food appliance leaves the factory.

Another feature of the invention is to provide a food appliance running programs that allow portions thereof to be modified by a group of parameters. This is accomplished by having the program execution responsive to a group of process parameters. In this way, the repertoire of the food appliance may be greatly increased without having inefficiently to store many similar programs which may only differ in some minor respect.

In one embodiment, a code from the coding system described above is used to identify a given program operating with a given set of values assigned to an associated group of process parameters.

In another embodiment, a set of predetermined permutations of values for the process parameters (i.e., a set of process parameter configurations) are coded. In this way, a user need only enter a program code to call up a desired program and enter a parameter code to specify a desired process parameter configuration from the predetermined set.

In another embodiment, the group of process parameters can be specified by a user by entering a desired value for each process parameter. For example, all things being equal, the user can modify the duration or temperature of one or more cycles of the program.

The accompanying drawings, which are incorporated in and form a part of this specification, illustrate embodiments of the invention and, together with the description, serve to explain the principles of the invention.

BRIEF DESCRIPTION OF THE DRAWINGS

FIG. 1 is a sectional side view of a breadmaker embodying the present invention;

FIG. 2 is a schematic of a coding system embodying the invention as incorporated in a breadmaker;

FIG. 3 is a flow chart of the operation by the control means for the coding system of FIG. 2;

FIG. 4 is an example of display on the display device of FIG. 2 after reset;

FIG. 5A illustrates one embodiment of the versatile food appliance with removable memory;

FIG. 5B is a sectional view of the embodiment shown in FIG. 5A;

FIG. 6 is a schematic block diagram of the versatile food appliance, according to a preferred embodiment of the invention;

FIG. 7 illustrates another embodiment of the versatile food appliance with removable memory;

FIG. 8 illustrates schematically an example lookup table for process parameter configurations; and FIG. 9 illustrates a table where a single code represents one combination of a parametric program and a process parameter configuration, according to a preferred embodiment.

DETAILED DESCRIPTION OF THE INVENTION

FIG. 1 shows a breadmaker 15 embodying the present invention, including components which are commonly known with reference to prior art breadmakers of a similar type. A baking chamber 50 containing an electric heater 52 near the bottom is formed inside a housing structure 54. The housing structure 54 is provided with a lid 56 which can be opened such that a baking pan 58 for receiving bread ingredients therein can be removably set inside the baking chamber 50. Adjacent to but separated by a chamber-separating wall 80 from the baking chamber 50 inside the housing structure 54, there is a motor chamber 60 containing a stirrer motor 62, of which the drive shaft is in motion-communicating relationship with a stirrer drive shaft 64 through a belt 66 such that stirrer blades (not shown) attached to the stirrer drive shaft 64 for stirring, kneading and mixing the contents of the baking pan 58 can be rotated in a specified manner, such as alternately in the clockwise and counter-clockwise directions, by activating the stirrer motor 62 in a controlled manner.

The motor chamber 60 further contains therein a fan motor 68 for a centrifugal fan 70 which is inside the baking chamber 50 but is separated from the baking pan 58 by a partition wall 72. The partition wall 72 has upper windows 82 above the centrifugal fan 70 and a lower inlet 84 below the centrifugal fan 70 such that, when the fan motor 68 activates the centrifugal fan 70, the air which has been heated by the heater 52 is forced upward therethrough as shown by upwardly pointing arrows in FIG. 1 through the space between the partition wall 72 and the chamber-separating wall separating the baking chamber 50 from the motor chamber 60. The upwardly pushed hot air is forced to pass through the upper windows 82 towards the baking pan 58, flows downward around the baking pan 58 as shown by downwardly pointing arrow in FIG. 1 and is then sucked through the lower inlet 84 towards the centrifugal fan 70. Thus, the heated air inside the baking chamber 50 is caused to circulate therein as shown by the arrows in FIG. 1 around the baking pan 58, instead of becoming discharged out of the baking chamber 50 as was the situation with prior art breadmakers of this type. As a result, heat is more efficiently utilized through convection by a breadmaker embodying the present invention such that up to 2.0 lbs of wheat bread and up to 2.5 lbs of white bread can be baked with the amount of energy required to bake about 1.5 lbs of bread by a prior art bread maker of a comparable design. Because the forced air circulation according to the present invention has the favorable effect of making temperature distribution uniform through the baking pan 58, furthermore, tastier bread with improved texture can be obtained.

A coding system according to the present invention will be described next as applied to a breadmaker such as the one described above with reference to FIG. 1, but it is applicable equally well to many other kinds of program-controlled machines adapted to operate according to any one of a plurality of programs which may each be associated with a different kind of product such as bread by receiving materials such as ingredients required in the selected program.

FIG. 2 shows the breadmaker 15 schematically, as incorporating a coding system according to this invention, including a table 16, a memory device 17 which stores many programs and may be considered a part of a central processing unit 18 serving as control means for controlling the general operation of the breadmaker 15 as a whole by following any of these programs, and a control panel 25 provided with a display device 30 such as a liquid crystal display and many switches and buttons as input devices including a STOP/RESET button 31, a COLOR button 32 for choosing between normal and light bread coloring, and a START button 33 for starting a cycle of baking operations according to a selected program. An important feature of the invention is that the kinds of bread which can be baked or the processes which can be carried out by the breadmaker 15 are each assigned a code, which is preferably numeric, but may also be alphabetic or alphanumeric. As a practical example, numerical codes "10", "20" and "60" are assigned to represent not only "basic bread", "whole wheat bread" and a process of "kneading", respectively, but also the corresponding programs stored in the memory device 17 and intended to be called through the control means 18 to control the operation of the breadmaker 15 for baking basic bread, baking whole wheat bread and carrying out a predefined kneading process, respectively.

The table 16 is for showing to a user what code has been assigned to each kind of bread or process that can be selected, for example, by listing in one column all the codes which can be specified and in another column the kinds of bread and processes corresponding to the codes in the first column.

According to a preferred method of using the coding system described above, ingredients to be used for making each kind of bread listed in the table 16 are made available in a premixed form in a package as schematically shown at 19. Each package is clearly marked with the code representing the kind of bread to be baked or process to be carried out, that is, the program to be followed by the control means 18. This method is advantageous because the possibility of making errors by the user can be reduced when ingredients are poured into the baking pan 58 of the breadmaker 15, and the user is spared of the trouble of preparing a required mixture of ingredients.

Next, the process of selecting a kind of bread to be baked or a process to be carried out and specifying it by a code to the control means 18 will be described with referenced to the flow chart of FIG. 3 as well as the schematic of FIG. 2.

According to most practical embodiments of the invention, the program which is used most frequently, or believed to be used most frequently, is treated as the default program. Since the basic kind of bread with normal coloring is usually selected most frequently, the program for baking the basic bread is defined as the default program such that, when the STOP/RESET button 31 is pressed to reset the control means 18 (YES in Step S1), the code "10" corresponding to BASIC BREAD is automatically selected. Thus, after a reset, the display on the display device 30 will be as shown in FIG. 4 (Step S2).

The control panel 25 is provided with an UP button 34 and a DOWN button 35 for changing the specified-program. The codes which are assigned to different kinds of bread and processes are arranged in a sequence (in an ascending order, for example, if the codes are numeric) such that, whenever the UP button 34 or the DOWN button 35 is pressed (YES in Step S3 or S5), the control means 18 selects the program corresponding to the next code in the sequence in the forward or backward direction, respectively, and causes the new code corresponding to the newly selected program to be displayed on the display device 30, as well as the name of the corresponding kind of bread or process selected (Step S4 or S6). Similarly, if the COLOR button is pressed (YES in Step S7), the selected color changes from normal to light or from light to normal, and the display on the display device 30 also changes from NORMAL to LIGHT, or from LIGHT to NORMAL (Step S8). When one of the codes and the bread color (normal or light) have been selected and the START button 33 is pressed (YES in Step S9), the control means 18 begins to operate the breadmaker 15 according to the selected one of the stored programs (Step S10).

As shown in FIG. 2, the control panel 25 is further provided with a timer button (TIMER) for entering the timer setting mode of operation to set a timer (not shown), a clock button (CLOCK) for entering the clock setting mode of operation to set a clock (not shown), an hour button (HR) and a minute button (MIN) for respectively setting the hour and the minute in the timer and clock setting modes, and a set button (SET) for setting the timer or the clock, as well as light emitting diodes marked TIMER, OPERATION and COMPLETE to show respectively that the control is in the timer setting mode, that the baking operation is going on and that the baking operation has been completed. These and similar kinds of buttons and diodes have been in use with prior art breadmakers, and their functions are well known by the users.

Thus, they are illustrated in FIG. 2 but will not be described in any detail herein.

The present invention was described above with reference to only a few examples. These examples are intended to be merely illustrative, however, and not limitative. Many modifications and variations are possible on the disclosed examples. For example, the coding system of the present invention need not relate to a breadmaker, or more generally to a food machine, but also to any program-controlled machine allowing a user to select one of a plurality of programs and operating on such a selected program by using a special material associated with the program. A particular coding method was illustrated above, but the codes need not necessarily be arranged in a sequence such that they appear in the display device one by one in that sequence, either in the forward or backward direction, to allow the user to decide whether or not to select the one of the choices being displayed. The control panel may be provided with numeric keys, or alphanumeric keys, to allow the user to form a numeric or alphanumeric code to directly call a desired program.

Versatile Appliance Having Updatable Programs

The coding system described above allows individual programs from a repertoire thereof previously preset into a machine to be efficiently identified and accessed. The other advantage is when a premixed package of food ingredients is labeled with an appropriate code, the user can conveniently call up the correct process in the machine by simply entering the code.

However, even with a large repertoire of programs preset into the machine at the time of manufacture, there may be occasions when a user may want to use a new recipe or a new premixed package of food ingredients that requires a new program not found in the existing repertoire of the machine.

One feature of the invention allows a machine or appliance to run additional new programs outside its existing repertoire. This is accomplished by providing facility for a user to transfer new programs to the appliance.

Another feature of the invention incorporates multiple functions into a versatile appliance operating under the control of programs which are updatable. In this way, one versatile machine or appliance can replace several dedicated machines.

FIG. 5A illustrates one embodiment of the versatile food appliance 115 with removable memory. This embodiment has a housing 154 with a front-opening door 156. The housing encloses a food processing chamber which is accessible through the opened door. On the housing is a control panel 125 with display through which a user can interact with the food appliance 115. In this example, the versatile food appliance is able to function as a toaster oven, a microwave oven and a breadmaker.

FIG. 5B is a sectional view of the embodiment shown in FIG. 5A. A chamber 150 is formed inside the housing structure 154. Inside the chamber is a pair of top and bottom electric heating elements 153, 155. Shelves or racks 157 are removably mounted in the chamber for supporting food to be processed. The shelves are resting on supports 159 on the chamber walls. By selectively powering either top or bottom or both heating elements 153, 155, the appliance can be made to function much like a toaster oven.

Adjacent to but separated by a chamber wall 180 from the chamber 150 inside the housing structure 154 is a motor chamber 160. The motor chamber contains a centrifugal fan 170. The centrifugal fan 170 draws air from the chamber through an inlet 182 near a bottom opening of the chamber wall 180 and blows it back into the chamber through an outlet 184 near a top opening of the chamber wall 180. When the centrifugal fan 170 is operating in combination with the heating elements 153, 159 the food appliance is functioning as a convention oven.

Between the top wall 151 of the chamber and the housing structure is optionally a magnetron 161 for providing a microwave source which is emanating into the chamber via a port from the top wall 151. The motor chamber 160 further contains a drive motor 162, of which the motor shift is in motion-communicating relationship, by means of a drive belt 166, with a drive shaft 164 extending into the chamber through the bottom chamber wall. A turntable is removably mounted on the drive shift, such as food placed on the turntable can be rotated in a specified manner, by activating the drive motor 162 in a controlled manner. When the magnetron operates in combination with the turntable, the food appliance is functioning as a microwave oven.

Alternatively, a bread pan 158 for receiving bread ingredients therein can be removably set inside the chamber 150, with a stirrer blade inside the bread pan engaged with the drive shift 164. Thus, bread making ingredients received in the bread pan can be stirred, kneaded and mixed through the action of the stirrer blade driven by the drive shift. In this way, the food appliance is functioning as a breadmaker.

It can be seen that the versatile food appliance is capable of operating like different dedicated food machines.

FIG. 6 is a schematic block diagram of the versatile food appliance, according to a preferred embodiment of the invention. Essentially, the versatile food appliance 115 comprises a plurality of hardware components controlled by an appliance controller 200.

The plurality of hardware components, depending on configurations, may include one or more motor drives 210. For example, in a microwave oven mode of operation, one of the motors is used to drive a turntable so that food supported thereon can get a more even microwave exposure. In a rotisserie mode of operation, one of the motor drives is used to rotate a rack so that food mounted thereon may be heated more evenly on all sides when exposed to localized heating elements. In a breadmaking mode of operation, one of the motor drives is used to turn a mixing and kneading blade inside a baking pan, as described in an earlier section.

Similarly, the plurality of hardware components, depending on configurations, may include one or more heater elements 212, such as the heater elements 153, 155 shown in FIG. 5B. These heater elements may be turned on individually or in combination in order to perform broiling, toasting, baking, self-cleaning etc.

When the food appliance includes a pan for receiving food ingredients, the heater elements enable it to operating in a slow cooking mode-similar to that of a crockpot. When the pan is partially filled with water and food is support above the water, the food appliance is able to operate as a steamer.

Similarly, the plurality of hardware components, depending on configurations, may include a magnetron 214, such as the magnetron 161 shown in FIG. 5B. In a microwave oven mode of operation, the magnetron is used to produce microwave heating in the chamber.

Similarly, the plurality of hardware components, depending on configurations, may include one or more fans 216, such as the centrifugal fan 170 shown in FIG. 5B. For example, in a convention oven mode or in a breadmaking mode of operation, the fan is used to circulate hot air in the chamber.

Similarly, the plurality of hardware components, depending on configurations, may include one or more solenoids 218. The solenoids are generally used to open or close valves or vents, and to actuate various mechanical contraptions.

Similarly, the plurality of hardware components, depending on configurations, may include other electromechanical transducer 220. U.S. Patent application, "Breadmaker With Improved Temperature and Humidity Control", filed on the same day as the present application, by Simon K. C. Yung, is incorporated herein by reference. The incorporated disclosure describes improved temperature and humidity control in which an ultrasonic humidifier is a component inside the breadmaking chamber.

The plurality of hardware components is controlled by a hardware control unit 240. A power supply 230 provides electric power to the plurality of hardware components under the control of the hardware control unit 240. Although, FIG. 6 shows a number of specific hardware components, it will be understood that various hardware components are optionally implemented. Other hardware components not shown are also contemplated. On the other hand, not all shown hardware components need be implemented at the same time.

The intelligence of the appliance controller is provided by a microprocessor 250 executing codes and programs that are stored in a non-volatile memory (NVM) 252 and a random-access memory (RAM) 254. The microprocessor, the NVM and the RAM are in communication with each other via a bus (not shown). In one embodiment, the NVM is in the form of a read-only memory (ROM). It stores firmware and a preset repertoire of programs that were initially shipped with the appliance. In another embodiment, the NVM is in the form of EEPROM or flash EEPROM memory which essentially provides rewritable mass storage. The RAM is typically used as a scratch patch memory when the microprocessor executes a program.

Another special feature of the present invention is the provision for updating the repertoire of programs in the appliance. This is accomplished by the ability to interchange data with the appliance controller.

In one embodiment, the new programs are transferred via a memory port which is able to receive a removable memory card that a user can plug into the appliance.

The appliance optionally includes a non-volatile memory interface 260 that interfaces with the microprocessor 250 on one hand and with a removable memory card 264 via a card connector 262 on the other hand. The memory card 264 is a non-volatile memory such as ROM, EPROM, EEPROM or preferably one of the standardized flash memory cards currently being introduced in other consumer products such as in digital still cameras, digital voice recorders and cellular, phones and handheld devices. Other possible non-volatile memories include magnetic and optical disks.

Since the removably memory cards are portable from host to host and are becoming standardized, they can be used to exchange data easily between a variety of hosts. For example, new or updated programs for the appliance may be created by the manufacturer or other developers and distributed on a ROM or flash memory card to the consumer. A new bread recipe embodied in a premixed package of ingredients may come with a new breadmaking program stored in a flash memory card or a floppy. In the latter case, the program on the floppy may be transferred to a flash card by means of a personal computer (PC). Alternatively, the programs could be downloaded from a website by the consumer and saved onto a flash card plugged into a PC. Then the flash card is moved to the general-purpose appliance to update or augment the existing programs therein.

In another embodiment, the updating of the repertoire of programs in the appliance is accomplished via a standard data port 295, such as a parallel port or a serial port or an infrared port provided on the food appliance.

The microprocessor 250 is in communication with the hardware control unit 240 via a digital interface 242 coupled to an internal bus 270 of the Appliance controller. The digital interface 242 provides conversions between analog and digital signals and enables the microprocessor to control the hardware control unit 240.

One or more sensors 280 provide detection of various conditions associated with the operation of the appliance. The signals from such sensors are received into the hardware control unit 240. In one embodiment, the signals are fed into a local servo circuit which is used directly to control some of the plurality of hardware components. In another embodiment, the signals are made available via the digital interface on the internal bus 270. The microprocessor 250 is then able to monitor the sensor signals and take appropriate actions accordingly.

An input/output (I/O) interface 290 is also in communication with the microprocessor 250 via the internal bus 270. The I/O interface allows one or more peripheral devices to interact with the appliance controller 200 and more particularly with the microprocessor 250. In the preferred embodiment, one such peripheral device is a display and input unit 292 such as the control panel 190 shown in FIG. 5B.

In another embodiment, the peripheral devices are externally connectable to the appliance and include a television 294 which can be used to display multimedia information. For example, a premixed package of ingredients may include a memory card that, given sufficient memory, stores a program for running the appliance plus a multimedia file which is a video clip giving cooking instructions for the particular package.

In another embodiment the peripheral devices externally connectable to the appliance include a personal computer 296 which is preferably connected via the standard interface 295 which is either a parallel port or a serial port to the I/O interface 290. This allows for multimedia files to be played back as well as for even more flexible exchange of data and control.

FIG. 7 illustrates another embodiment of the versatile food appliance 115 with removable memory. This embodiment is essentially similar to that shown in FIG. 5A except it has a taller form factor. It has a housing 154 with a top-opening door 156. The housing encloses a food processing chamber which is accessible through the opened door. On the housing is a control panel 125 with display through which a user can interact with the food appliance 115. The taller form factor lends itself to accept a baking pan with its long axis vertical and engaged to a vertical drive shift at the bottom of the chamber, much like that of a conventional breadmaker. When the appliance operates in rotisserie mode, the baking pan is replaced by a rotisserie rack engaged on the vertical drive shift. In this case, the heating element is preferably a line element running vertically along a wall of the chamber.

The improved food appliance may be a versatile, multi purpose food machine depending on the program it is running. Its basic functions can include radiant heating, microwave heating, mechanical mixing and turning, and combination thereof. For example, the improved food appliance is programmable to act as any number of standalone machines such as a breadmaker, various type of oven, a rice-cooker, among others. Although the food appliance has been described with a multitude of optional hardware components, not all components need be implemented at the same time. Similarly, even a number of peripheral devices are shown, not all peripheral connections need be implemented at the same time.

Coding System for Process Parameters

Another feature of the invention is to provide a food appliance that allows the process it is running to be modifiable by a group of parameters. Many of the processes run by a food appliance are similar and only differ in some portions of the process, the variation being definable by a group of process parameters. For example, two processes may differ by the duration or temperature in one cycle thereof.

This feature of the invention is accomplished by setting up programs in parametric form where the parametric program executes its process responsive to a process parameter configuration, i.e., values assigned to a predetermined group of process parameters. In this way, the repertoire of the food appliance is greatly increased without having to store many similar programs.

In one embodiment, the process parameter configuration can be specified by a user by entering the values for each of the parameters directly via the food appliance input device. For example, the user can modify the duration or temperature of one or more cycles of the program. The input values are stored in a set of registers in the appliance controller. When a program is being executed by the food appliance, it references the registers to configure corresponding program variables.

In a preferred embodiment, the coding scheme described earlier for program identification and indexing can also be used to do the same for identifying and indexing any number of process parameter configurations. A lookup table in memory stores a plurality of process parameter configurations and their associated codes and indices.

FIG. 8 illustrates schematically an example lookup table 316 for process parameter configurations. A group of process parameters may be given by (cycle number, temperature, duration, . . . ) A process parameter configuration is defined when all the parameters in the group are assigned definite values. A parameter code is assigned to each predetermined process parameter configurations. For example, the parameter code 520 is assigned to the process parameter configuration (5, 120, 20, . . . ), the parameter code 540 to (5, 140, 20, . . . ), etc. Thus, the parameter configuration lookup table 316 contains coded indexed entries of process parameter configurations. Each entry may optionally contain additional information associated with the configuration, such as a description of the configuration. Similar to the table 16 shown in FIG. 2, the additional information may be shown on the display of the food appliance for the user's convenience.

In this way, a desired process to run on the food appliance is selected when its associated parametric program is called up by its program code, and the associated process parameter configuration for the program is called up by its parameter code.

FIG. 9 illustrates a table 16' using a single code to represent one combination of a parametric program and a process parameter configuration, according to a preferred embodiment. The table 16' is similar in structure to the table 16 shown in FIG. 2. The single code may be formed by a concatenation of the program code and a parameter code.

In a system including a food appliance and a plurality of packaged ingredients, an appropriate code or set of codes may be marked on each package of ingredients, similar to what has been described earlier so that the same code may be entered into the food appliance to call up the appropriate program and process parameter configuration to process the ingredients.

While the embodiments of the various aspects of the present invention that have been described are the preferred implementations, those skilled in the art will understand that variation thereof may also be possible. The device and method described therein are applicable to a versatile food appliance that is capable of using updatable programs to operate the appliance in a variety of modes normally available individually through conventional dedicated food appliances. Therefore, the invention is entitled to protection within the full scope of the appended claims.

It is claimed:

1. A food appliance, comprising:

a chamber for processing food therein;

one or more food processing functional units inside said chamber;

a controller for controlling operations of said one or more food processing functional units;

a first memory for storing a repertoire of preprogrammed processes;

an input for receiving input data into said food appliance, including data designating a preprogrammed process among said repertoire of preprogrammed processes;

control means for operating said controller according to the designated preprogrammed process; and a port for updating said repertoire of preprogrammed processes with one or more additional preprogrammed processes.

2. A food appliance as in 1, wherein said one or more food processing functional units include a radiant heater.

3. A food appliance as in 1, wherein said one or more food processing functional units include a microwave heater.

4. A food appliance as in 1, wherein said one or more food processing functional units include a mechanical actuator.

5. A food appliance as in 1, wherein said port is a memory port connectable to a removable memory.

6. A food appliance as in 1, wherein said port is a data port connectable to a data source.

7. A food appliance as in 1, wherein said one or more additional preprogrammed processes are obtainable from said removable memory.

8. A food appliance as in 1, wherein said one or more additional preprogrammed processes are obtainable from a website.

9. A food appliance as in 5, wherein said removable memory includes read only memory.

10. A food appliance as in 5, wherein said removable memory includes EPROM.

11. A food appliance as in 5, wherein said removable memory includes EEPROM.

12. A food appliance as in 5, wherein said removable memory includes flash EEPROM.

13. A food appliance as in 5, wherein said removable memory includes a magnetic storage medium.

14. A food appliance as in 5, wherein said removable memory includes an optical storage medium.

15. A food appliance as in anyone of 1–14, further comprising:

a pan inside said chamber for receiving ingredients therein.

16. A food appliance as in anyone of 1–14, further comprising:

a rack inside said chamber for supporting the food being processed.

17. A food appliance as in anyone of 1–14, further comprising:

a magnetron for providing microwave heating in said chamber.

18. A food appliance as in anyone of 1–14, including a preprogrammed process that operates said food appliance in a baking mode.

19. A food appliance as in anyone of 1–14, including a preprogrammed process that operates said food appliance in a broiling mode.

20. A food appliance as in anyone of 1–14, including a preprogrammed process that operates said food appliance in a toasting mode.

21. A food appliance as in anyone of 1–14, including a preprogrammed process that operates said food appliance in a microwave heating mode.

22. A food appliance as in anyone of 1–14, including a preprogrammed process operates said food appliance as a rotisserie.

23. A food appliance as in anyone of 1–14, including a preprogrammed process that operates said food appliance as a breadmaker.

24. A food appliance as in anyone of 1–14, including a preprogrammed process that operates said food appliance as a rice cooker.

25. A food appliance as in anyone of 1–14, including a preprogrammed process that operates said food appliance as a slow cooker.

26. A food appliance as in anyone of 1–14, including a preprogrammed process that operates said food appliance as a steamer.

27. A food appliance as in anyone of 1–14, including a preprogrammed process that operates said food appliance in a high-heat, self-cleaning mode.

28. A food appliance as in anyone of 1–14, including an input/output interface for one or more peripheral devices to operate with the food appliance.

29. A food appliance as in 28, wherein said one or more peripheral devices include a multimedia system.

30. A food appliance as in 29, wherein said multimedia system include a personal computer.

31. A food appliance as in 29, wherein said multimedia system include a television.

\* \* \* \* \*